United States Patent [19]
Perotto et al.

[11] Patent Number: 6,079,739
[45] Date of Patent: Jun. 27, 2000

[54] PYROTECHNIC GAS GENERATOR WITH AN ADAPTABLE FLOW RATE FOR AIR BAGS

[75] Inventors: Christian Perotto, Ballancourt; Denis Bourcart, Les Lilas, both of France

[73] Assignee: Livbag S.N.C., Vert le Petit, France

[21] Appl. No.: 09/066,444

[22] PCT Filed: Oct. 24, 1996

[86] PCT No.: PCT/FR96/01659

§ 371 Date: Apr. 30, 1998

§ 102(e) Date: Apr. 30, 1998

[87] PCT Pub. No.: WO97/16695

PCT Pub. Date: May 9, 1997

[30] Foreign Application Priority Data

Oct. 30, 1995 [FR] France .................................. 95 12767

[51] Int. Cl.$^7$ ................................................. B60R 21/26
[52] U.S. Cl. ............................................ 280/736; 280/741
[58] Field of Search ..................................... 280/741, 735, 280/736, 742

[56] References Cited

U.S. PATENT DOCUMENTS

| | | |
|---|---|---|
| 3,407,732 | 10/1968 | Przybylik et al. . |
| 3,724,870 | 4/1973 | Kurokawa et al. . |
| 3,773,352 | 11/1973 | Radke . |
| 3,773,353 | 11/1973 | Trowbridge et al. . |
| 3,904,221 | 9/1975 | Shiki et al. . |
| 3,972,545 | 8/1976 | Kirchoff et al. . |
| 5,301,978 | 4/1994 | Munzel et al. . |
| 5,400,487 | 3/1995 | Gioutsos et al. ............ 280/735 |

FOREIGN PATENT DOCUMENTS

| | | |
|---|---|---|
| 2 174 607 | 10/1996 | Canada . |
| 382 552 | 8/1990 | European Pat. Off. . |
| 609 981 | 8/1994 | European Pat. Off. . |
| 738 631 | 10/1996 | European Pat. Off. . |
| 2 233 202 | 1/1975 | France . |
| 2 593 907 | 8/1987 | France . |
| 372560 | 4/1923 | Germany . |
| 2 107 859 | 9/1971 | Germany . |
| 2107859 | 10/1973 | Germany ................. 280/736 |
| 2301881 | 10/1985 | Germany . |
| 4239167 | 5/1994 | Germany . |
| 92/22441 | 12/1992 | WIPO . |

*Primary Examiner*—Eric Culbreth
*Attorney, Agent, or Firm*—Pillsbury Madison & Sutro LLP

[57] ABSTRACT

A pyrotechnic gas generator with adaptable flow rate for air bags including a hollow body in which a sealing partition (9) defines two separate combustion chambers (1a, 1b) each containing a different gas-generating pyrotechnic charge (2a, 2b). An initiator (3) with two heads (4, 5) and a single power supply ignites each of the two charges at different times. The two heads (4, 5) may be provided with separate different resistors (R1, R2) or incorporated into a switching bridge including four switches combined with a diode circuit. The generator (10) is useful for making a gradual generator for an air bag for protecting the driver of a motor vehicle.

9 Claims, 5 Drawing Sheets

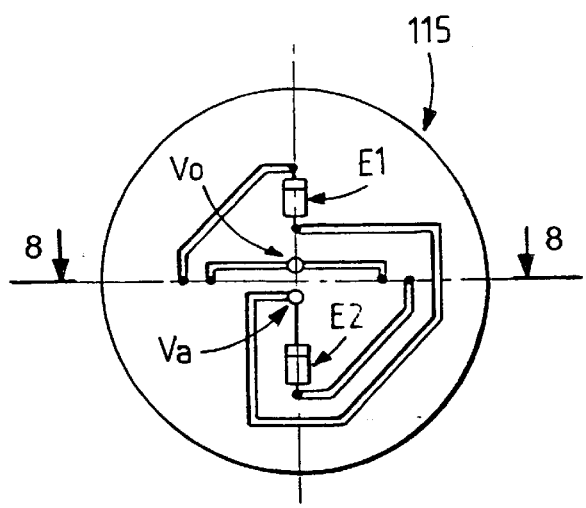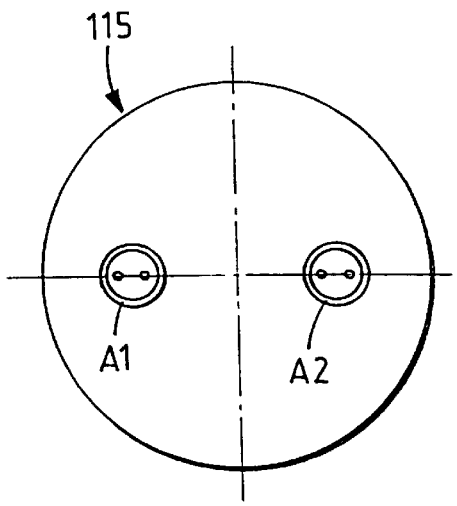
FIG.6  FIG.7
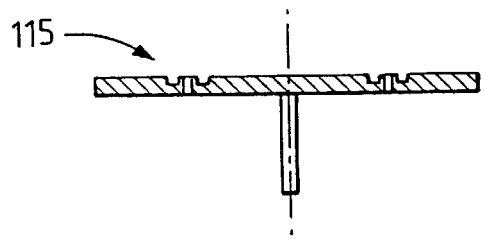
FIG.8
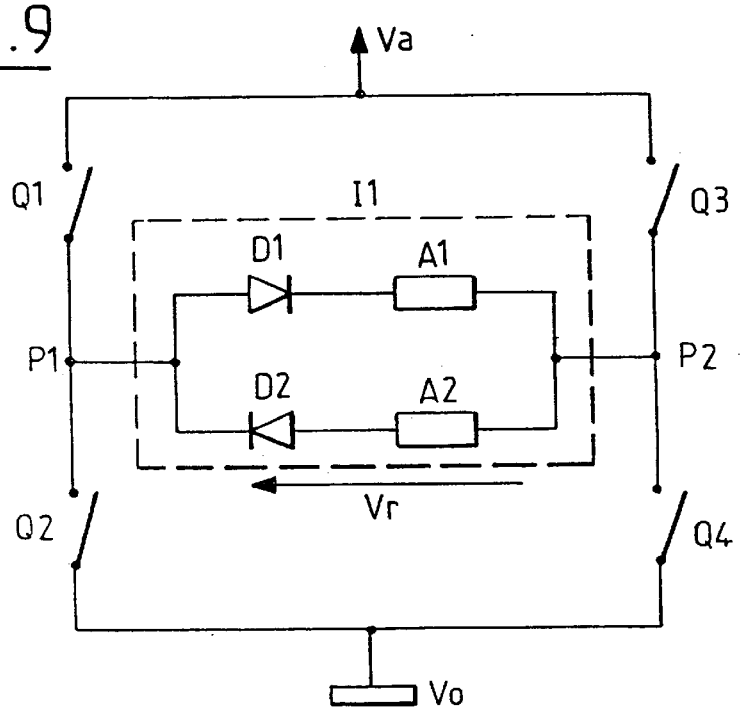
FIG.9

PYROTECHNIC GAS GENERATOR WITH AN ADAPTABLE FLOW RATE FOR AIR BAGS

The invention relates to the field of motor-vehicle safety and deals more specifically with pyrotechnic gas generators for inflating air bags.

Current gas generators as described in numerous patents generally have a combustion chamber containing a propergol which generates gas which may, in the case of "hybrid" generators, be associated with a reserve of compressed gas. These generators are generally initiated by means of an electrical initiator. By way of example, PCT Patent Application WO 92/22441 and U.S. Pat. No. 5,301,978 correspond to these "hybrid" generators.

Recently, new so-called "progressive" generators have appeared and these, by means of two electric initiators placed in two separate combustion chambers, allow the flow rate of the generator to be adapted as a function of various parameters such as the temperature, the nature and the intensity of the impact, size and position of the passenger. The triggering of the two initiators is generally offset in time by a few milliseconds. This offset is achieved electronically and in a way that can be programmed in time in order to optimize the flow rate from the generator and therefore the pressure level obtained in the bag. U.S. Pat. No. 3,972,545, which forms the basis of the preamble of claim 1, describes a "passenger" gas generator. This generator comprises two chambers with pyrotechnic charge, separated by a consumable partition, and each containing an initiator. Depending on the intensity of the impact, the triggering of the two initiators which are connected to one single electrical supply may occur at different instants. When a low-voltage electrical signal is emitted, only one chamber is fired using an electric igniter, the second being fired when the partition separating the two chambers is consumed. On the other hand, when a high-voltage electrical signal is emitted, the two electric igniters are activated, and this causes simultaneous firing in both chambers. Furthermore, it is clear from this that the volume of gas released in both cases is identical. This generator is therefore indeed progressive and furthermore allows the two pyrotechnic charges to be ignited simultaneously.

Another type of progressive generator, more particularly designed to protect a passenger, is disclosed in Patent Application EP-A-382 552. This generator consists of a single-piece cylindrical part split into two parts by an internal partition and has two combustion chambers each containing a pyrotechnic charge and an initiator, each initiator being connected to a separate electrical supply, which increases the cost and size. In operation, the two chambers are fired, under all circumstances, in a way which is offset over time so as to optimize the flow rate of gas and therefore the pressure level obtained in the air bag.

These systems display numerous drawbacks, such as their bulk and their cost, and this considerably restricts their application, particularly for "driver" systems. The generators described today in patents and in publications relate essentially to "passenger" gas generators which are less restricted in terms of size and weight than "driver" generators. Patent Application EP 0 609 981 defines a "driver" gas generator which makes it possible to vary the duration of combustion of the pyrotechnic charge by using two initiators which can be fired in succession or simultaneously. However, the use of two independent and separate initiators requires electrical supplies which are also separate and this increases the cost and size.

All of these problems mean that such technologies are very difficult to apply to generators of a low cost and small size, and therefore in particular to "driver" generators.

Those skilled in the art therefore have no solutions available to them that will allow the same functions to be obtained using means which are better suited to cost and size constraints.

The object of the invention is precisely to propose such a generator.

The invention therefore relates to:

a progressive pyrotechnic gas generator intended for motor-vehicle safety and comprising in particular a hollow body comprising a lid and a side wall and which at the opposite end to its said lid has an opening in which a closure ring is fastened, the said hollow body in particular containing two separate gas-generating pyrotechnic charges and having orifices placing the inside and the outside of the said hollow body in communication, characterized in that:

i) the said hollow body comprises a gastight partition making it possible to form within the said hollow body two independent combustion chambers each containing one of the two pyrotechnic charges, ii) the said closure ring supports an electronic igniter device making it possible either to ignite just one of the two pyrotechnic charges, or to ignite each of the two pyrotechnic charges at different instants.

It should be noted that in the context of the present invention, the two pyrotechnic charges may be identical or different.

As a preference, the said hollow body is a body which has symmetry of revolution.

Preferably too, the igniter device consists of an electronic initiator with two heads, each being likenable to an igniter, and the initiator has just one electrical supply.

According to a first preferred version, each of these two heads has a separate and different resistance.

According to a second preferred version, each of its two heads has a separate resistor incorporated into a switching bridge comprising four switches which can be switched in pairs, combined with a multi-way switching circuit produced using a diode circuit. Advantageously, these switches consist of transistors which may be included in a single module.

In these embodiments, the said partition envelopes the initiator in leaktight fashion and holds it in place.

As a preference, around the said orifices in the said generator there is an annular chamber for stabilizing and diffusing the gases.

The invention is explained in greater detail with the aid of FIGS. 1 to 9.

FIG. 6 is a view of the lower face of the igniter plate of the generator depicted in FIG. 4.

FIG. 7 is a view of the upper face of the igniter plate of the generator depicted in FIG. 4.

FIG. 8 is a front-on view, sectioned on 8—8, of the igniter plate depicted in FIGS. 6 and 7.

FIG. 9 is an electrical diagram of the electrical device for firing the two heads of the generator depicted in FIG. 4.

Figure 1:
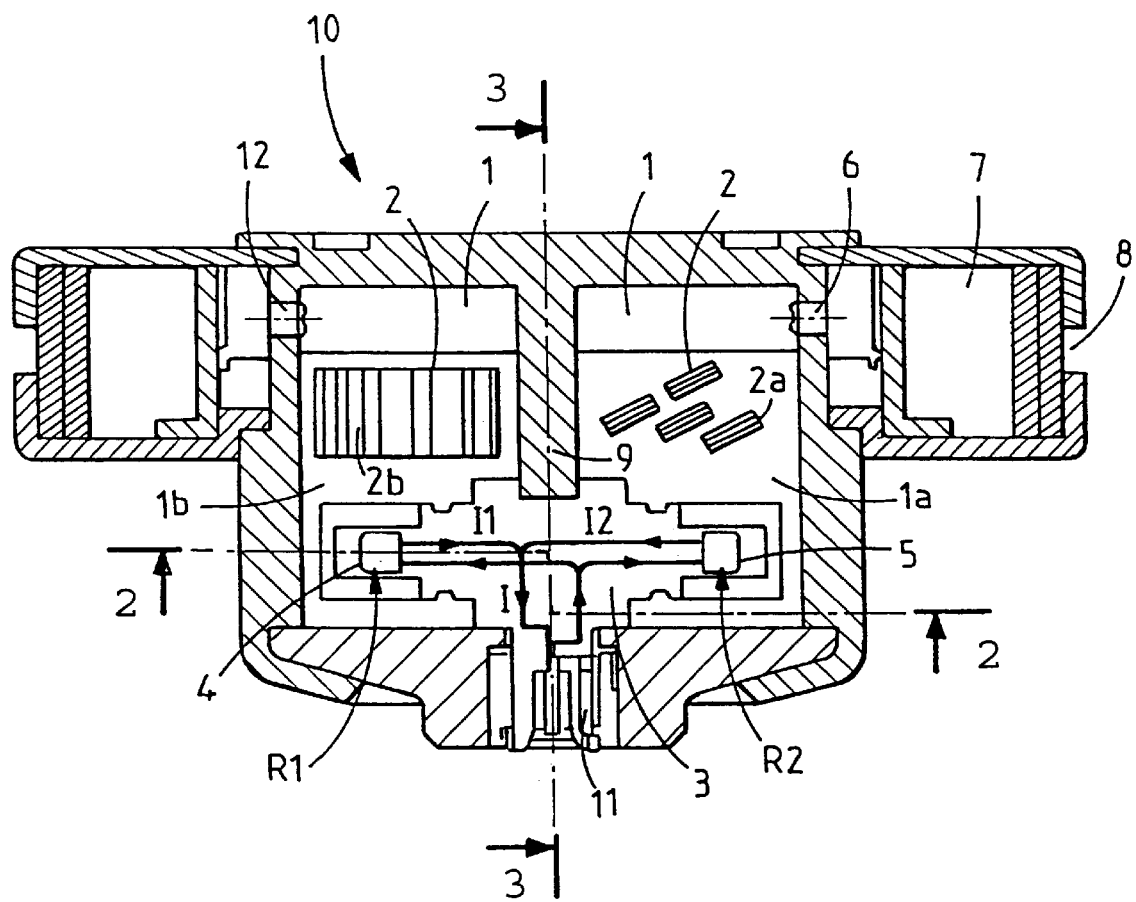
FIG. 1 is a front view, sectioned on 1—1 of FIG. 2, of a generator according to the first preferred version of the invention.
Figure 2:
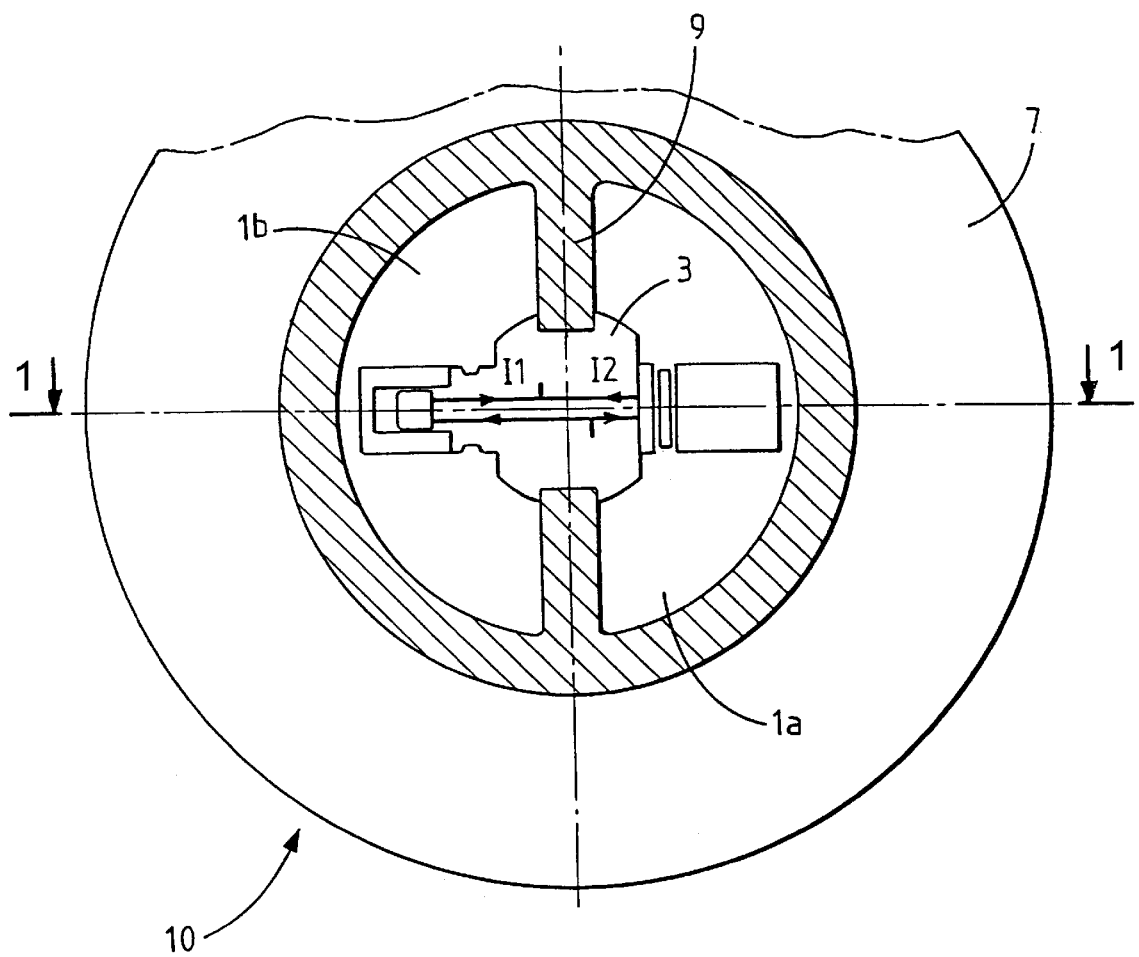
FIG. 2 is a part view from below, sectioned on 2—2, of the generator depicted in FIG. 1.
Figure 3:
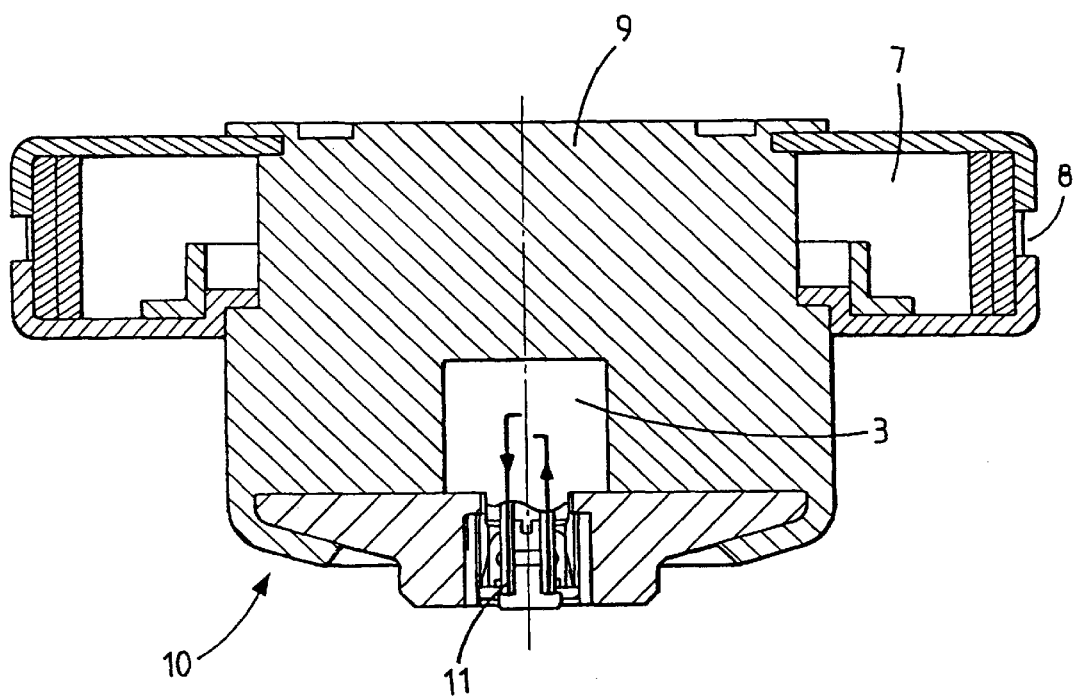
FIG. 3 is a side view, sectioned on 3—3, of the generator depicted in FIG. 1.
Figure 4:
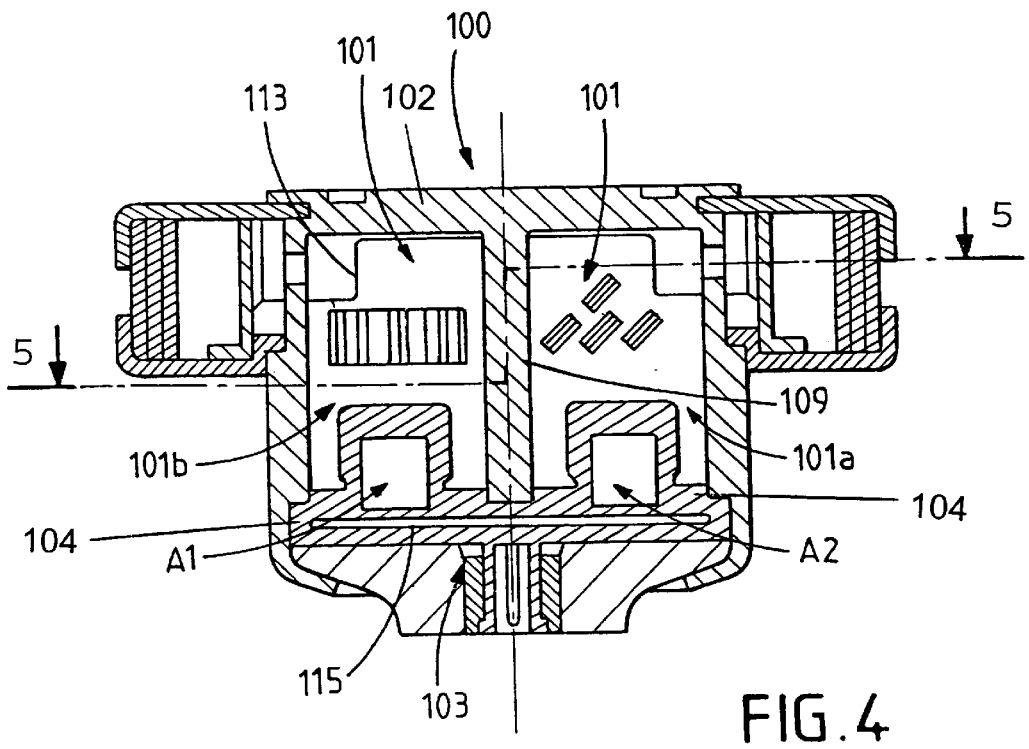
FIG. 4 is a front-on part view, sectioned on 4—4 of FIG. 5, of a generator according to the second preferred version of the invention.
Figure 5:
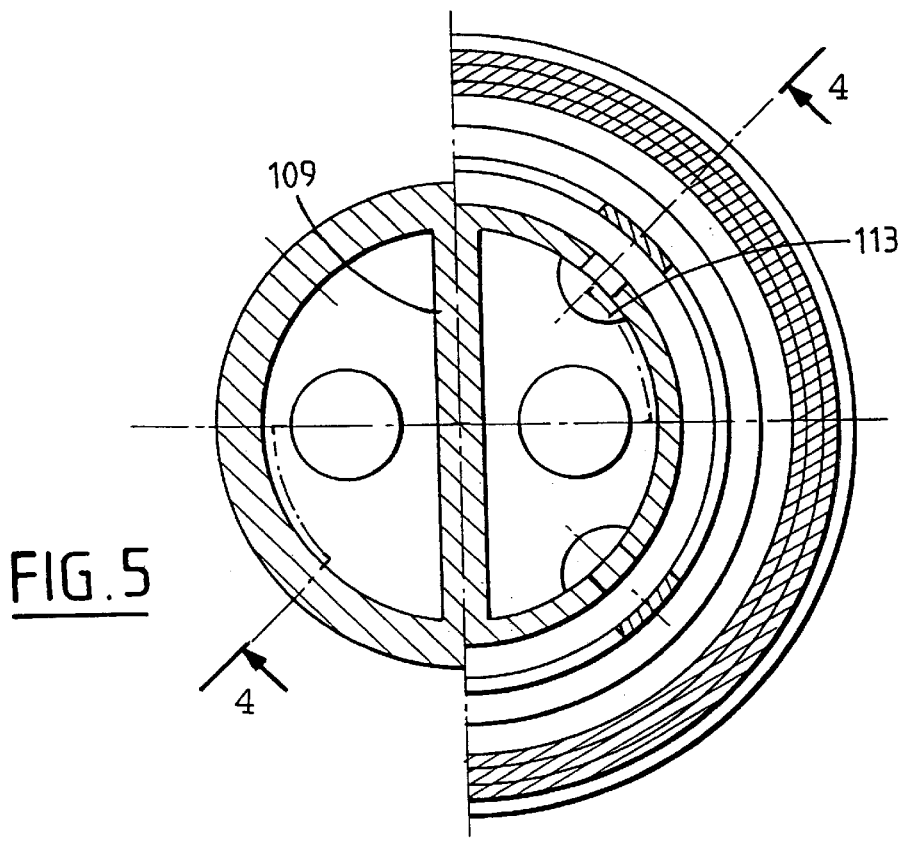
FIG. 5 is a part view from above, sectioned on 5—5, of the generator depicted in FIG. 4.

An example of a generator 10 according to the first preferred version is shown in FIGS. 1 to 3. This generator 10 of the "driver" type has a geometric bulk which is interchangeable with those present on the market today. Its total mass is of the order of 500 g and is compatible with all existing systems.

This "driver" generator 10 consists of two independent combustion chambers 1, and more specifically chambers 1a and 1b separated by a partition 9 and containing a solid propellant 2 in the form of pellets 2a or in the form of a monolith 2b, based on composite propellant or on double-base propellant or alternatively on propellant based on sodium azide. The masses of propellant contained in each chamber can vary as a function of the desired effects and may, for example, correspond to the inflating of a bag the volume of which varies between 60 and 80 liters. The two combustion chambers are initiated by the double-head initiator 3 using the same current. Each head 4 and 5 of the double initiator having a different resistance therefore makes it possible to obtain an offset which may, for example, be as much as 10 ms, between the initiation of the two chambers. This time delay may also be regulated by the strength of current delivered by the electronic unit. The following example will make it easier to understand the principle of operation of this type of initiator:

chamber 1b:
resistance=R1
no-fire current=200 mA
all-fire current=800 mA/2 ms
chamber 1a:
resistance=R2
no-fire current=1000 mA
all-fire current=1600 mA/2 ms The various types of operation available are therefore as follows, depending on the firing current delivered by the electronic unit, the two heads being mounted in parallel, I representing the intensity of the electric current in amps:

for I>x mA, x corresponding to a value (of the order of 3000 mA) sufficient to initiate the resistances R1 and R2 in parallel: simultaneous initiation of the heads 4 and 5 (t<2 ms), for 200 mA<I<y mA, y corresponding to a value (of the order of 1000 mA) sufficient to initiate only the resistance R1: initiation of head 4 alone (t<2 ms), for I between x and y: simultaneous initiation (t<2 ms) of head 4 and initation of head 5 with a pre-defined delay.

It is therefore possible easily to be able either to initiate both chambers simultaneously in order to obtain a maximum flow rate allowing complete inflation of an 80-liter bag for example, or to trigger just one chamber only in order to obtain a lower flow rate and inflate the bag only partially, for example to 60 liters. Depending on the applications and the requirements, it is possible after calibration and if necessary to vary the time delay and therefore the flow rate of the generator continuously as a function of the current delivered by the electronic unit.

An example of a generator according to the second preferred version is shown in FIGS. 4 to 9.

The "driver" generator 100 consists of a hollow body 102 which has two combustion chambers 101, and more specifically 101a and 101b separated by a partition 109 which envelopes the initiator 103 in leaktight fashion and holds it in place, and containing a pyrotechnic charge equivalent to the one described earlier. An insulating cylindrical envelope 113 is arranged inside the hollow body 102 of the pyrotechnic generator 100, and its free end is trapped between the interior surface of the hollow body and a closure ring 104. The heads 4 and 5 of the initiator are incorporated into a switching bridge comprising four switches Q1 to Q4 which can be switched in pairs and are combined with a multi-way switching circuit produced by a circuit of diodes D1 and D2.

FIG. 9 quite particularly allows the operation of the igniter plate 115 to be described.

Each pair of switches Q1, Q2 and Q3, Q4 is mounted between a firing voltage Va and the electrical earth of the circuit Vo. The mid-points P1 and P2 of each arm are connected to the initiation unit I1 composed of two heads 4 and 5, respectively containing the resistors A1 and A2 connected together and containing two diodes D1 and D2 allowing one of the heads 4 or 5 to be isolated depending on the polarity of the firing voltage Vr, the switches Q1 to Q4 being closed or open in turn, according to the following table:

if Q1 and Q4 are closed, and Q2, Q3 are open, then the voltage Vr is positive, the diode D1 allows current to pass and resistor A1 is subjected to the electrical current, therefore leading to the firing of the head 4. The diode D2 does not allow current to pass and the resistor A2 is not subjected to the electrical current, if Q2 and Q3 are closed, and Q1, Q4 are open, then the voltage Vr is negative, the diode D2 allows current to pass and resistor A2 is subjected to the electrical current, therefore leading to the firing of the head 5. The diode D1 does not allow current to pass and the resistor A1 is not subjected to the electrical current.

As shown in FIG. 6, the subassemblies E1 and E2 correspond to the combination of switches Q1 to Q4 and diodes D1 and D2. Subassembly E1 comprises the switches Q1, Q4 and the diode D1 and subassembly E2 comprises the switches Q2, Q3 and the diode D2. Advantageously, the switches Q1 to Q4 will consist of transistors which can be built into a single module.

It is therefore possible easily to be able either to initiate the two chambers in turn and therefore inflate the bag to its maximum extent after a time delay, or to initiate, by choice, just one chamber and therefore obtain less filling of the bag.

After initiation, the generator 10 or 100 operates on the same principle as conventional generators, that is to say that the membrane 6 is blown out, the gases pass into a stabilization chamber comprising a diffuser 7 and an exit for the gases through symmetrically distributed holes 8.

Two two-chamber generators have therefore been developed which make it possible to obtain the same effects as those described earlier. These two chambers are initiated independently using a single initiator with two heads. This double initiator is powered in the normal way using a single electrical circuit from an electronic control unit.

In the context of the first preferred version, the delay between the initiation of the two heads is therefore provided by their different configuration. A simple way of varying the reaction time of the heads of the initiator is to use, for example, explodable filaments with different electrical resistances. Thus, for a strength of current supplied by the electronic unit it will be possible to trigger the two heads of the initiator simultaneously or with an offset which is programmed in time.

In the context of the second preferred version, initiation of one of the two heads by choice, or the delay between the initiation of the two heads each having a separate resistance, is then ensured by incorporating these heads into a switching bridge comprising four switches which can be switched in pairs combined with a multi-way switching circuit produced using a diode circuit. Thus, depending on the direction of electrical current supplied by the electronic unit, it will then be possible to trigger either one of the two heads of the initiator, or both after a time delay.

These generators therefore have the advantage of requiring just one electrical supply and can therefore practically be incorporated into configurations very similar to those conventionally used today. The fact that this replaces two initiators having two independent circuits also allows a considerable reduction in the cost of these systems.

This type of technology is particularly effective for applications where the bulk and weight of the generator are essential parameters, something which is generally the case as far as "driver" systems are concerned.

These principles can obviously be applied with advantage to "passenger" systems and to new generators for side protection.

These pyrotechnic generators are particularly well suited to this technology where the search is a priori for products which are very simple and inexpensive but which can also be used for hybrid generators or any other type of generator like those that use liquefied gases or reactive gases.

In addition, the second preferred version of the invention has certain advantages over the first:

- it goes some way to alleviating a drawback that consists in developing and manufacturing two different types of igniters,
- it makes it possible to diagnose any possible defect in the connection of the igniters,
- it allows the igniters to be isolated in the event of a leak,
- for igniters on silicon support, for example igniters of the "SCB" type, the diodes can be integrated into the same substrate as the pyrotechnic initiator element. This approach allows the cost of manufacturing the initiator to be optimized.

What is claimed is:

1. A progressive pyrotechnic gas generator intended for motor-vehicle safety comprising a hollow body having an inside and an outside, opposed ends and a side wall joining the opposed ends, a lid at one end of said hollow body, an opening at the opposite end of the hollow body, a closure ring fastened in said opening, said hollow body containing two separate gas-generating pyrotechnic charges and having orifices placing the inside and the outside of the said hollow body in communication, a gas-tight partition within said hollow body forming two independent combustion chambers each containing one of the two pyrotechnic charges, said closure ring supporting an electric igniter device for igniting one of the two pyrotechnic charges or each of the two pyrotechnic charges at different instants.

2. Generator according to claim 1, wherein said hollow body is a body which has symmetry of revolution.

3. Generator according to claim 1, wherein the igniter device comprises an electric initiator with two heads.

4. Generator according to claim 3 wherein the igniter device has a single electrical supply.

5. Generator according to claim 4, wherein each of the two heads has a different resistance.

6. Generator according to claim 4, wherein each of the two heads has a separate resistor incorporated into a switching bridge comprising four switches which can be switched in pairs, combined with a multi-way switching circuit comprising a circuit of diodes.

7. Generator according to claim 6, wherein the four switches comprise transistors.

8. Generator according to claim 7, wherein the said transistors are incorporated into a single module.

9. Generator according to claim 1 including a chamber around said orifices for stabilizing and diffusing gas which is generated.

* * * * *